United States Patent [19]

Feig

[11] Patent Number: 5,319,502
[45] Date of Patent: Jun. 7, 1994

[54] SYSTEM AND METHOD FOR EMPLOYING BURIED SERVOS WITHIN A MAGNETIC RECORDING MEDIUM

[75] Inventor: Ephraim Feig, Briarcliff Manor, N.Y.

[73] Assignee: International Business Machines Corporation, Armonk, N.Y.

[21] Appl. No.: 819,549

[22] Filed: Jan. 10, 1992

[51] Int. Cl.⁵ .......................... G11B 5/09; G11B 5/02; G11B 5/03
[52] U.S. Cl. ........................................ 360/46; 360/29; 360/66
[58] Field of Search .................... 360/29, 46, 66, 75, 360/77.01, 77.02, 77.07, 77.12, 65; 332/170

[56] References Cited

U.S. PATENT DOCUMENTS

| | | | |
|---|---|---|---|
| 3,404,392 | 10/1968 | Sordello | 340/174.1 |
| 3,585,529 | 6/1971 | Darlington | 332/170 |
| 3,765,005 | 10/1973 | Cannon | 340/174.16 |
| 3,821,798 | 6/1974 | Cannon | 360/51 |
| 3,864,740 | 2/1975 | Sordello et al. | 360/77 |
| 3,956,769 | 5/1976 | Beecroft et al. | 360/77 |
| 4,110,799 | 8/1978 | Bergmans et al. | 360/70 |
| 4,313,140 | 1/1982 | Keidl | 360/77 |
| 4,314,289 | 2/1982 | Haynes | 360/77 |
| 4,318,141 | 3/1982 | Haynes | 360/77 |
| 4,390,911 | 6/1983 | Klaassen | 360/77 |
| 4,414,589 | 11/1983 | Oliver et al. | 360/77 |
| 4,488,188 | 12/1984 | Hansen et al. | 360/77 |
| 4,547,817 | 10/1985 | Klaassen | 360/29 |
| 4,581,663 | 4/1986 | Tanaka | 360/77 |
| 4,590,524 | 5/1986 | Okamoto et al. | 360/65 |
| 4,766,508 | 8/1988 | Mathewson | 360/77 |
| 4,885,646 | 12/1989 | Kanota et al. | 360/46 |

OTHER PUBLICATIONS

E. Feig, "Linear Methods for High-Density Magnetic Recording of Data", IEEE Transactions on Magnetics, vol. 25, No. 3, 1989, pp. 2769-2779.

E. Feig, "AC-Bias Magnetic Recording of Data", IBM Technical Disclosure Bulletin, vol. 32, No. 7, Dec. 1989, pp. 286-288.

Primary Examiner—Donald Hajec
Assistant Examiner—Won Tae C. Kim
Attorney, Agent, or Firm—Sterne, Kessler, Goldstein & Fox

[57] ABSTRACT

A recorder system provides simultaneous data information and track following servo information from a buried servo layer disposed under a data recording layer in a magnetic medium, using the same transducer for simultaneously reading the servo and data information while writing data. The signals representing data are shaped to provide a wide gap around zero frequency (DC) for inclusion of servo information in the gap, and as a result, segregated data and servo information is read by the recorder through use of filtering techniques.

27 Claims, 2 Drawing Sheets

SYSTEM AND METHOD FOR EMPLOYING BURIED SERVOS WITHIN A MAGNETIC RECORDING MEDIUM

TECHNICAL FIELD

The present invention relates to recording storage systems and particularly those magnetic storage systems employing "buried servos" for track-following operations to improve the tracking accuracy of the magnetic recording head thereby increasing the density of tracks and data storage density, i.e. high track densities with high lineal densities.

BACKGROUND ART

It has long been recognized that higher areal density recording can be achieved with a high degree of reproduction if servo signals, i.e., track location indicating signals, could be superposed with data signals in a magnetic storage system. Although recognized, a technique for accomplishing this goal has never been commercially exploited because of the degradation of the "buried servo" or track-position indicating signals, the interference with the data signal by the buried servo, and the expense of providing a multiple layer magnetic storage system, one layer for the position indicating signals and another for the data signals.

Buried servos have been long recognized as an effective means for faithful track positioning control. The prior art systems shown and described in U.S. Pat. Nos. 4,313,140, 4,314,289 and 4,318,141 employ a single-gap transducer for recording a data signal while at the same time sensing prerecorded servo control signals. To effect this simultaneous writing and reading operation, it was necessary to minimize the effect of the counter electromotive force (abbreviated counter emf) induced by the recording data signal on the signal-to-noise ratio of the servo control signals. For this purpose, the recording circuit of the system included an AC bias and a high-pass filter to improve the signal-to-noise ratio of the servo control signals. A notch filter was further required to suppress frequencies of the data signal to reduce the counter emf.

However, the signal-to-noise ratio of the servo control signals was found to be still not satisfactory and the use of an AC bias and filters added to complexity with an attendant cost increase.

Notwithstanding these problems, the art has attempted to obtain higher areal density recording with a high degree of faithful reproduction. An early teaching of superposed data and servo signals is found in the F.J. Sordello U.S. Pat. No. 3,404,392 which teaches using a dual-layer magnetic coating on a disk substrate. Servo signals are first recorded by being placed in a lower layer of the substrate for indicating track positions. Data signals are recorded in a higher layer subsequent to the recording of the servo signals. Both the servo and data signals are then sensed. For each data recording operation, an erase gap precedes a read/write gap so that the data signals can be successfully recorded in the upper layer. During readback, the data signals are read back by a single gap, and two sets of servo signals are simultaneously read back. The servo signals are linearly recorded sine waves written in concentric circular tracks and they exhibit a low frequency. Adjacent servo tracks are written at different frequencies. Each data track is defined as being superposed over one-half of an odd numbered servo track and one-half of an even-numbered servo track. The data signals and servo signals exist in the magnetic medium independently of the other. In this dual-layered record medium, recording the data signals at a high frequency, at least three or four times the frequency of the servo signals in the lower layer, enables the data signals to be separated from the servo signals. Sordello achieves this independence requirement by providing a record disk having a lower level with a higher coercivity than the upper level which stores the data signals. This arrangement allows the lower level servo signals to remain undisturbed by subsequent writing and rewriting of data signals in the upper layer. The single gap permits perfect alignment for simultaneously reading the control or servo signals with data signals.

M.R. Cannon in U.S. Pat. No. 3,765,005 discloses using a clock-bias signal at the upper end of a data signal frequency spectrum. Also, U.S. Pat. No. 3,821,798 shows a low-frequency control signal recorded at a lower end portion of the data signal pass band.

A later reference showing "buried servo" is Beecroft et al., U.S. Pat. No. 3,956,769. Beecroft et al. teach the use of two separate gaps in a transducer, one for servo signals and the other for data signals. U.S. Pat. No. 4,313,140 to Keidl shows read and write circuits connected to a magnetic medium. A control signal circuit having band or low-pass frequency characteristics is connected to a transducer for receiving sensed control signals simultaneously while the write means is supplying information-bearing signals for recording. The recording and sensing operations occur simultaneously via a single-gap transducer. The recorder also has an information-bearing signal readback circuit.

M.K. Haynes in U.S. Pat. No. 4,318,141 discloses a magnetic recorder having a single gap magnetic transducer adapted to exchange signals within an adjacent magnetic record medium which has a hard recorded control signal, i.e., the signal exhibits a retentivity characteristic exemplified by signals recorded using a head having an effective gap length greater than a gap length to be used with subsequent data signal recordings. The control signal is preferably a narrow band, low frequency sinusoidal-type signal. The single-gap transducer is connected to a recording means having high-pass frequency characteristics for supplying information-bearing signals to the transducer for recording on an adjacent magnetic surface. Also connected to the transducer is a control signal circuit having low-pass frequency characteristics for receiving sensed control signals simultaneously while the write means is supplying information-bearing signals for recording. The operation is enhanced by an AC bias means connected to a transducer for supplying an AC bias signal simultaneously with said recording and sensing operations. The recorder also has an information-bearing readback circuit.

The above prior art in general essentially left a spectral "notch" around zero frequency range (DC) for "buried servo." The "notch" was insufficient. It was found in some cases that the servo signals attenuated gradually by the writing of data into the disk until reaching some asymptotic power around 6 dB lower than the original signal power. The servo signals often interfered with the data signals at readback. In the write process, some of the buried servo information was erased.

DISCLOSURE OF INVENTION

The present invention solves these problems associated with the prior art systems referred to above. The servo signals are written on a disk during fabrication to be read during both the reading and writing of data onto the disk. These servo signals are used for positioning the head appropriately on the track which is either written upon or from which data is read.

It is therefore an object of the present invention to provide an improved magnetic recorder that overcomes the problems associated with the aforementioned prior art systems.

It is also an object of the present invention to provide an improved "buried servo" control signal recording apparatus.

It is another object of the present invention to prevent the erasure of "buried servo" in the write process and to prevent the servo signals from interfering with the data signals at readback. A further object of the invention is to widen the spectral "notch" provided in the prior art systems in order to properly bury servo signals during fabrication and prevent the aforementioned problems from occurring.

In accordance with the present invention, a magnetic recorder has a transducer adapted to exchange signals with an adjacent magnetic record medium. The record medium has a deeply recorded servo control signal. The term "deeply recorded" means that the signal exhibits a retentitivity characteristic exemplified by signals recorded deeply into the medium—as opposed to the shallow recording of data information or data signals on said magnetic medium. The servo control signal is preferably but not limited to a narrow-band low frequency signal such as is presently used in known disk-track following servo systems. The transducer is connected to a recording or writing means and modulating means for supplying information-bearing signals to the transducer for recording on the magnetic medium. The modulating means manipulates the data signal to create a spectral gap around zero frequency (DC), wide enough so that it does not interfere with the buried servo signal. An AC bias is further added to the data signal to permit the data signals to be recorded linearly. The recording of data and sensing of servo signals may occur simultaneously or separately via the transducer. Because of this simultaneous occurrence, the servo signal can be read while the data signal is written, thus facilitating accurate positioning of the head on a desired track which solves a key problem associated with the prior art. The recorder also has an information-bearing signal readback circuit which converts the manipulated data signal back to its original data format. Servo and data information may be isolated using a low pass or high pass filter respectively. Thus, the manipulation of the read signal permits the separation of servo information from data information and solves a second problem associated with the prior art systems.

The foregoing and other objects, features and advantages of the invention will be apparent from the following more particular description of a preferred embodiment of the invention, as illustrated in the accompanying drawings.

BEST MODE FOR CARRYING OUT THE INVENTION

Figure 1:
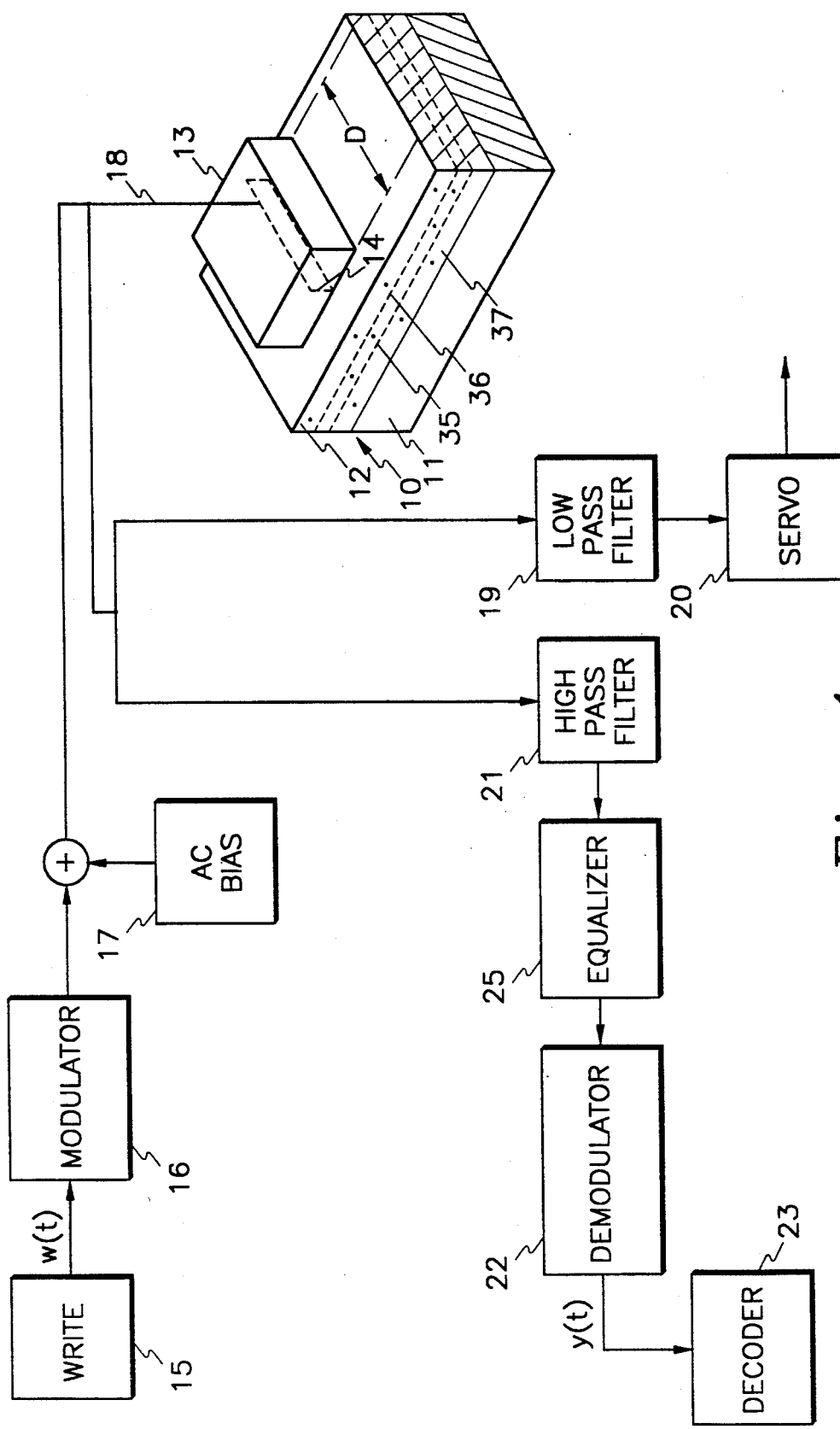
FIG. 1 is a schematic diagram of a magnetic recorder employing the present invention, particularly illustrating the magnetic medium, transducer attached thereto, and write and readback circuits attached to the transducer.

A magnetic record medium 10 consists of a suitable substrate 11 supporting a magnetic coating 12 shown in FIG. 1. Coating 12 can be any usual magnetic coating, preferably a magnetic oxide. Substrate 11 can be either a tape, disk, card, or other shape.

Figure 2A:
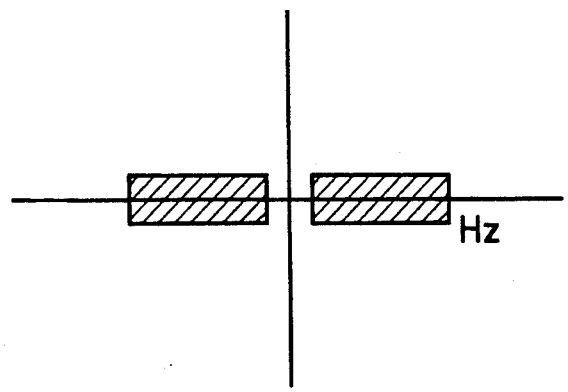
FIGS. 2(a) through 2(d) is an illustration of analog data signals represented at various points in the read/write circuits shown in FIG. 1.
Figure 2B:
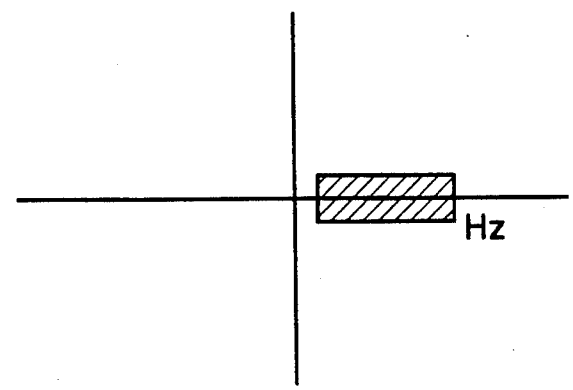
Figure 2C:
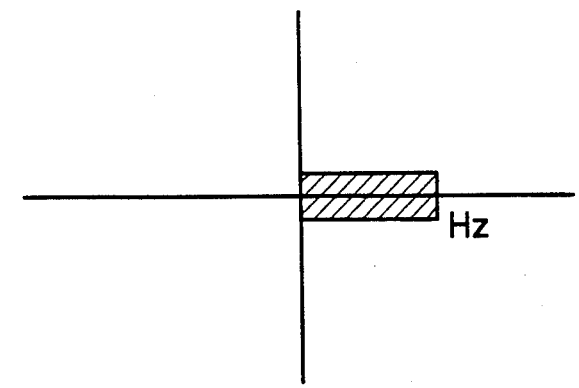
Figure 2D:
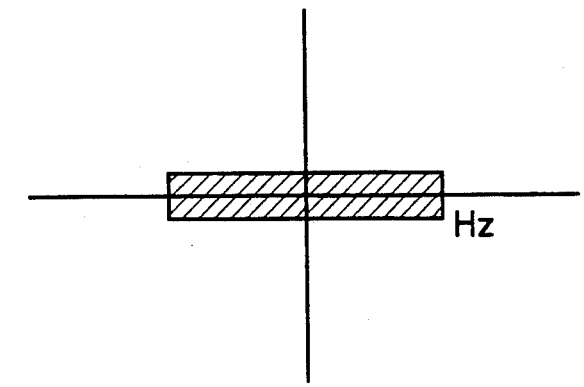

A data recording operation begins with a write or signal generating means 15 shown in FIG. 1, constructed in the usual manner, supplying a bit stream representative of data to a modulator 16. The write generating means 15 provides a write current $$w(t) = \sum_k b_k z(t - kT)$$

where $b_k = \pm 1$ and represents the binary data, z is a basic pulse function which will be described below, T is the interpulse time interval and the summation runs over the entire length of the binary data. The modulator 16 is a digital Weaver modulator, discussed in Sidney Darlington's *On Digital Single-Side Band Modulators*, IEEE Transactions On Circuit Theory, Vol. CT-17, No. 2 (Aug. 1970), which functions to produce a Hilbert transform, a frequency shift through multiplication and an inverse Hilbert transform. This modulator 16 passes a write signal whose spectral envelope is first shown in FIG. 2(d), through an inverse Hilbert transform which produces the signal whose spectral envelope is shown in FIG. 2(c). That signal, whose frequency response is the original restricted to the positive side of the frequency axis, is then shifted to the right through a multiplication by $e^{+itA_o}$ for some constant $A_o$, yielding the signal whose spectral support is shown in FIG. 2(b). $A_o$ determines the width of the gap, which must be greater than the band width of the servo signal. The resultant signal is then passed through a Hilbert transform whose frequency response is the original with a separation or gap about zero frequency (DC) as shown in FIG. 2(a). There thus occurs as a result of this Hilbert transform a gap about zero frequency (DC), where servo information is stored.

Connected to the output of the modulator 16 is an AC bias 17, with suitable filtering techniques, to linearly record the data signals during the write operation. The output of the modulator 16, with the added AC bias 17, is fed on line 18 to the transducer or head 13. This procedure produces a linearized recording channel whose transfer function in the frequency domain is $\phi(\omega)$. The transducer 13 is magnetically coupled to magnetic media or coating 12 and gap 14 located on the transducer. Thus, the data signals are stored in magnetic medium 10 through gap 14.

A recorder employing the present invention uses buried servo or track position indicating signals for the purpose of keeping the read/write head positioned accurately over the desired track. For recording purposes, it can be assumed that such position indicating signals have already been recorded on magnetic coating 12. Three distinct low frequency sinusoidal signals are used as servo information for the entire disk. Each track is assigned one of the three frequencies, and every three consecutive tracks are assigned all three frequencies. The gap in the signal should be wide enough to accomodate all three frequencies. These servo signals may be written with an AC bias circuit.

After such servo signals are recorded, an erase signal (not shown or otherwise described) erases a surface portion of the magnetic media 12, extending to media 12 as indicated by dashed line 35. Subsequent data recording via gap 14 preferably will go to dashed line 36, no limitation thereto intended. This initial erasure reduces the amount of remanance in coating 12 representing the position indicating or servo signals. This position erasure has a stabilizing effect on the recorded position indicating signals such that repeated data recording via gap 14 does not continually degrade the recorded position indicating signals. Data signals can now be recorded and read back without intervening erasures.

A readback circuit is also connected to lead 18 for receiving a combined signal transmitted by transducer 13 from coating 12. The combined signal is split into two separate signals. The servo signal is routed through a low-pass filter 19 whose cut-off frequency is higher than the frequencies of the servo signal, but lower than the frequencies of the data signal, and the data signal is routed through a complementary high-pass filter 21. The readback circuit includes an equalizer 25 with frequency response $E(\omega)$ connected to the high pass filter 21. Servo information from servo decoder 20 is derived from the low-pass filter 19 and controls the position of the head to be on track. The output S(t) of the high-pass filter 21 is sent as an input to a demodulator 22 explained below. The demodulator 22 is the inverse of modulator 16. The output of the demodulator 22 is transmitted to decoder 23 which decodes the desired data signal, e.g. PR-IV signal as described in R.W. Wood and D.A. Peterson, *Viterbi Detections of Class IV Partial Response On A Magnetic Recording Channel*, IEEE Transctions On Communications, Vol. COM-34, No. 5 (May 1986), or $$r(t) = \sum_k b_k y(t - kT) + N(t)$$

where $b_k$, T, and the summation range are as discussed above, $$y(t) = 2\left[\frac{\sin(\pi t/T)}{\pi t/T} - \frac{\sin[\pi(t - 2T)/T]}{\pi(t - 2T)/T}\right]$$

and N(t) is the noise. This output is sampled at times t=nT for integer values, and the sampled values $$y_n \triangleq y(nT) = b_n - b_{n-2} + N_n$$

are passed to a standard PR-IV decoder. Let $Y(\omega)$ denote the Fourier transform of y(t). Let $$X(\omega) = 2T\sin(2\pi\omega T) \text{ where } |\omega| < \frac{1}{2T}$$

Let $N(\omega)$ denote the noise spectrum at the output of the read head. The analog write signal is then $$\omega(t) = \sum_k b_k z(t - kt)$$

where z is the real valued function whose Fourier transform is $$Z(\omega) = \frac{Y(\omega)N(\omega)^{\frac{1}{2}}}{|X(\omega)|^{\frac{1}{2}}}$$

The output of the channel is equalized with a filter which in the frequency domain has the form $$A(\omega) = \frac{|Y(\omega)|^{\frac{1}{2}}}{\phi(\omega)N(\omega)^{\frac{1}{2}}}$$

This minimizes the noise power output in an additive noise environment.

The demodulator 22 is a Hilbert transform, followed by a linear phase-shift, followed by an inverse Hilbert transform. This demodulator operation is illustrated in FIG. 2 FIG. 2(a) is the frequency power spectrum of the signal coming out of the equalizer 25. This signal is passed through a Hilbert transform filter which produces an analytic signal whose frequency response is the original restricted to the positive side of the frequency axis, as shown in FIG. 2(b). The signal is then shifted so that its leftmost support is at the origin. This is shown in FIG. 2(c). This frequency shift is a simple multiplication by $e^{-tA_o i}$ for the constant $A_o$. The result is passed through an inverse Hilbert transform yielding the desired PR-IV signal shown in FIG. 2(d). The combined signal can also be split into two separate signals with the use of a finite impulse response filter.

Based on the preferred embodiment disclosed above, one can encode data in any desired frequency band supported by the channel in a linearized channel as shown above. In particular, one can leave a gap around DC for "buried servo." By use of the present invention, sufficient separation between servo and data signals is achieved. Furthermore, the servo signal does not significantly interfere with the data signal during readback.

While the invention has been particularly shown and described with reference to a preferred embodiment thereof, it will be understood by those skilled in the art that various changes in form and details may be made therein without departing from the spirit and scope of the invention.

Having thus described our invention, what we claim as new and desire to secure by Letters Patent is:

1. A magnetic recorder having a magnetic medium and a transducer means connected thereto which is adapted to receive a data signal from a write circuit means, comprising:
    a first write means for producing a position indicating signal for recording on said magnetic medium;
    means for generating said data signal in said write circuit means;
    modulating means in said write circuit for producing a wide gap around zero frequency in the data signal input to the magnetic medium, wherein said gap is greater than the bandwidth of position indicating signal;
    read circuit means connected to said transducer means for receiving an output signal therefrom, said output signal including said data signal with a wide gap around zero frequency and said position indicating signal; and means for segregating said position indicating signal and said data signal from said output signal.

2. The recorder of claim 1, further comprising:
a demodulating means to remove said wide gap from said data signal so that the resultant data signal output is substantially the same as the data signal output from said generating means in said write circuit means.

3. The magnetic recorder of claim 1 further comprising:
an AC source means biasing the data signal output from said modulating means to minimize noise in the recorder.

4. The magnetic recorder of claim 1 wherein said data signal is a PR-IV signal.

5. The magnetic recorder of claim 1 wherein said position indicating signal is stored on a lower level of said magnetic medium than said data signal.

6. The recorder of claim 1 wherein the modulating means comprises:
an inverse transform means for producing a data signal whose frequency response is restricted to a positive side of a frequency axis.

7. The recorder of claim 1 wherein said segregating means comprises:
a low frequency filter.

8. The recorder of claim 1 wherein said modulating means comprises:
a Weaver modulator.

9. The recorder of claim 1 wherein said resultant data signal output is decoded by a decoder means.

10. The recorder of claim 1 wherein said position indicating signal produced by said segregating means is decoded by a decoder means.

11. The recorder of claim 1 wherein said modulating means removes the low frequency component of said data signal so that said data signal does not interfere with said position indicating signal.

12. The recorder of claim 1 further comprising:
an AC source means biasing said position indicating signal produced by said first write means.

13. The recorder of claim 1 wherein said means for segregating comprises:
a finite impulse response filter.

14. The recorder of claim 2 wherein said demodulating means comprises:
a Weaver demodulator.

15. The recorder of claim 2 wherein the demodulating means comprises:
a transform means for removing the negative side of the frequency response of said data signal with said wide gap.

16. The recorder of claim 6 wherein the modulating means further comprises:
a phase shift means so that the leftmost support of the frequency response is shifted away from zero frequency.

17. The recorder of claim 7 wherein said segregating means further comprises:
a high frequency filter.

18. The recorder of claim 15 wherein the demodulating means further comprises:
a shift means so that the left support of said frequency response is shifted to zero frequency.

19. The recorder of claim 16 wherein the modulating means further comprises:
a transform means for producing a negative side of said frequency response and a wide gap between positive and negative sides of said frequency response.

20. The recorder of claim 18 wherein the demodulating means further comprises:
a transform means for restoring said data signal to the form it possessed when output from said data signal generating means.

21. A magnetic recorder having a transducer adapted to exchange signals with an adjacent magnetic recording medium, the magnetic recorder adapted to record a data signal and a position indicating signal within the magnetic recording medium, the magnetic recorder comprising:
(a) write means, connected to the transducer, for writing the data signals and the position indicating signals onto the magnetic recording medium, said write means having,
(1) modulating means for receiving the data signal and for producing a gap around zero frequency in the data signal to produce a gap signal, wherein said gap is greater than the bandwidth of the position indicating signal, and
(2) AC bias means, connected to said modulating means and to the transducer, for linearly adding an AC bias signal to the gap signal to produce a recording signal, wherein said recording signal is recorded on the magnetic recording medium via the transducer, and
(b) read means, connected to the transducer, for reading the data signals and the position indicating signals from the magnetic recording medium, said read means having segregating means for segregating said recording signal and the position indicating signal.

22. The magnetic recorder of claim 21 further comprising means for recording the position indicating signal on the magnetic recording medium.

23. The magnetic recorder of claim 21, wherein said modulating means comprises:
(A) means for producing an inverse Hilbert transform of said data signal to produce a first signal,
(B) means for shifting said first signal to produce a second data signal, and
(C) means for producing a Hilbert transform of said second signal to produce said gap signal.

24. The magnetic recorder of claim 21, wherein the data signal is a PR-IV signal.

25. The magnetic recorder of claim 21, wherein said segregating means comprises:
(1) a low pass filter,
(2) a high pass filter, wherein the position indicating signal is routed through said low pass filter and the data signal is routed through said high pass filter,
(3) an equalizer connected to said high pass filter, and
(4) demodulating means, connected to said equalizer, for removing said gap from said data signal so that the resultant data signal is substantially the same as the data signal before said gap is placed in said data signal.

26. The magnetic recorder of claim 25, wherein said demodulating means comprises:
(A) means for producing a Hilbert transform of said recording signal to produce a first signal, (B) means for shifting said first signal to produce a second signal, and (C) means for producing an inverse Hilbert transform of said second signal to produce a third data signal that is substantially the same as the data signal received from said modulating means.

27. A magnetic recorder having a magnetic medium and a transducer means connected thereto which is adapted to receive a data signal from a write circuit means, comprising:

first write means for producing a position indicating signal for recording on said magnetic medium;

means for generating said data signal in said write circuit means;

modulating means in said write circuit for producing a wide gap around zero frequency in the data signal input to the magnetic medium;

(a) means for producing an inverse Hilbert transform of said data signal to produce a first signal, (b) means for shifting said first signal to produce a second signal, and (c) means for producing a Hilbert transform of said second signal to produce a third signal having a gap around zero frequency, wherein the width of said gap is greater than the bandwidth of said position indicating signal.

read circuit means connected to said transducer means for receiving an output signal therefrom, said output signal including said data signal with a wide gap around zero frequency and said position indicating signal; and means for segregating said position indicating signal and said data signal from said output signal.

* * * * *